United States Patent [19]

Nukina et al.

[11] 3,759,985

[45] Sept. 18, 1973

[54] METHOD FOR PREPARING SALTS OF SULFOALKYL ESTERS

[75] Inventors: Shogo Nukina, Osaka; Yoshihiro Hayashi; Kyohei Yamada, both of Kyoto, all of Japan

[73] Assignee: Sanyo Chemical Industries, Ltd., Kyoto, Japan

[22] Filed: Jan. 28, 1971

[21] Appl. No.: 110,650

[30] Foreign Application Priority Data
Jan. 28, 1970 Japan................................. 45/7510

[52] U.S. Cl............................................. 260/486 R
[51] Int. Cl............................................. C07c 69/54
[58] Field of Search ................................. 260/486 R

[56] References Cited
UNITED STATES PATENTS
3,359,305  12/1969  Sheetz............................ 260/486 R FOREIGN PATENTS OR APPLICATIONS
1,042,719  9/1966  Great Britain.................. 260/486 R
1,383,552  2/1964  France........................... 260/486 R Primary Examiner—Lorraine A. Weinberger
Assistant Examiner—Paul J. Killos
Attorney—Oblon, Fisher & Spivak

[57] ABSTRACT

Salts of sulfoalkyl acrylate or salts of sulfoalkyl methacrylate can be produced in high purity by reacting salts of acrylic acid or salts of methacrylic acid with 1,3-propane sultone or 1,4-butane sultone in the presence of acrylic acid or methacrylic acid.

4 Claims, No Drawings

METHOD FOR PREPARING SALTS OF SULFOALKYL ESTERS

BACKGROUND OF THE INVENTION

This invention relates to a process for producing salts of sulfoalkyl acrylate or methacrylate. The products of this invention may be represented by the formula:

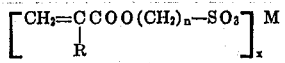

$$\left[ CH_2=C-COO(CH_2)_n-SO_3 \right]_x M$$
$$\quad\quad\quad\; |$$
$$\quad\quad\quad R$$

wherein R is hydrogen atom or methyl group, $n$ is an integer of 3 to 4, $x$ is an integer of 1 to 2 and M is a cation having valency of 1 to 2. The products of this invention, and the desalted products thereof are useful as monomers in preparing various polymers. In particular, copolymers of these products with acrylonitrile can be used to provide acrylic fibers having good dye affinity. Copolymers of the products of this invention with various vinyl monomers provide emulsions characterized by good stability. The homopolymers and various copolymers of these products are especially valuable as flocculants and antistatic agents.

There are three conventional methods for producing salts of sulfoalkyl acrylates or methacrylates which have been used or suggested in the prior art. One process involves esterification of acrylic acid with a hydroxyalkanesulfonate. Another process comprises reacting a salt of acrylic acid with 1,3-propane sultone or 1,4-butane sultone. A third process involves the reaction of a halide of acrylic acid with a hydroxyalkanesulfonate. Each of these processes, however, have several disadvantages, which render them at least partially unsuitable for commercial purposes. In the first process, the reaction must be carried out in a heterogeneous system, because the salt of hydroxyalkanesulfonic acid is insoluble in acrylic acid. This causes difficulties in the completion of the esterification, and even if the reaction is carried out for an extended period of time, the product will contain unreacted hydroxyalkanesulfonate, which is very difficult to separate. The second process also provides a product having undesirable impurites. It has been found that there are no suitable solvents for this process when aromatic hydrocarbons are used as the solvent, such as benzene, toluene or xylenes, which are inert to the alkane sultone, both the salt of acrylic acid and the product therefrom are insoluble in the solvents. Consequently, the product will contain unreacted salts of acrylic acid whose separation is very difficult. When the solvent used is an alcohol, such as methanol or ethanol, the alkane sultone will react with the alcohol to produce a by-product, which decreases the purity of the resulting product. In the third process a hydrogen halide is generated which can react with the primary reactants and with the double bond and/or the sulfonic acid group in the product, thereby producing by-products which can be very difficult to separate from the desired product.

A need exists therefore for a method of preparing salts of sulfoalkyl acrylate or methacrylate in high purity and in high yields.

SUMMARY OF THE INVENTION

It is, therefore, an object of this invention to provide a commerically practicable process for producing salts of sulfoalkyl acrylate or salts of sulfoalkyl methacrylate in high purity and in high yield. This and other objects have now been attained by the process which comprises reacting at least one salt selected from the class consisting of salts of acrylic acid and salts of methacrylic acid with at least one alkane sultone selected from the class consisting of 1,3-propane sultone and 1,4-butane sultone, in the presence of at least one acid selected from the class consisting of acrylic acid and methacrylic acid, in an amount of at least one-half mole per mole of the said salt.

The salts used in this invention include the salts of acrylic acid or methacrylic acid with a cation having the valency of 1 to 2. Typical examples are alkali metals (e.g., sodium, potassium and lithium), alkaline earth metals (e.g., calcium, magnesium and barium), ammonium acrylates, and the corresponding methacrylic acid salts. A mixture thereof may be used. Preferred are sodium and potassium methacrylates and acrylates.

Suitable alkane sultones used in this invention include 1,3-propane sultone, 1,4-butane sultone and mixtures thereof. Suitable acids used in this invention include acrylic acid, methacrylic acid and mixtures thereof. The acid acts as a solvent in this invention. In addition the acid may react with the alkane sultone, because the salt and the acid may be in an equilibrium state in the reaction mixture.

The ratio of the salt to the alkane sultone may generally be 0.9 – 1.1, and preferably equivalent amounts are used. The amount of the acid must be at least one-half mole (preferable two-thirds to 10 moles) per mole of the salt. Amounts of less than one-half mole of the acid is insufficient to dissolve the salt and the product in this invention, and use of such lower amounts would render it difficult to carry out the reaction smoothly.

One practical method for carrying out this reaction is to prepare a mixture of the salt and the acid in a molar ratio of at least one-half mole of acid to 1 mole of salt. The sultone is then reacted with the salt dissolved in the acid. The mixture of the salt and the acid is usually prepared by simply mixing the salt with the acid. It may also be prepared by neutralizing the acid with a basic compound such as sodium hydroxide, potassium hydroxide, potassium carbonate, sodium bicarbonate, potassium bicarbonate and ammonia so as to be within the ratio mentioned above. Sodium and potassium carbonates and ammonia are preferable.

A small amount of other inert solvents (i.e., less than 50 percent by weight based on the weight of the acid) such as benzene, toluene and xylenes may be used in addition to the acid. The use of an excess amount of such solvent is not preferable, however, since it decreases the solubility of the salt and the product of this invention in the solvent mixture.

The reaction temperature may vary within a wide range, generally between 30° – 160° C., and preferably between 50° – 140° C.

The reaction in this invention is preferably carried out in the presence of a polymerization inhibitor. Suitable inhibitors include hydroquinone, hydroquinone monomethyl ether, phenol, pyrogallol, phenothiazine.

The product salts of sulfoalkyl acrylates and salts of sulfoalkyl methacrylates can be easily separated from the solvent. Thus, the mixture of the reaction product may be cooled to precipitate the product with or without the addition of a solvent which dissolves acrylic acid or methacrylic acid, and not the product. Examples of such selective solvents include the alcohols (e.g., methanol, ethanol and propanol), hydrocarbons (e.g., benzene, toluene and petroleum ethers), ketones, esters, chloroform, carbon tetrachloride. The product in this invention may be obtained in crystal form by filtering the precipitate and drying the obtained solid. The filtrate (acrylic acid or methacrylic acid) may be re-used in the subsequent reaction without any treatment, or after recovery by extraction or distillation, if the solvent has been used to precipitate the product.

The advantage of this invention is that a high purity product can be obtained in commercially high yields. This unique advantage is achieved by the presence of acrylic acid or methacrylic acid in the reactant.

Having generally described the invention, a further understanding can be attained by reference to the following examples which are presented as illustrative of this invention only and it will be understood that the invention is not limited thereto.

EXAMPLE 1

Methacrylic acid (43 g.), sodium methacrylate (108 g.) and hydroquinone monomethyl ether (0.5 g.) were placed in a reaction vessel equipped with a stirrer, thermometer, reflux condenser and dropping funnel. To the mixture 1,3-propane sultone (122 g.) was dropwise added at 110° – 120° C. while stirring for over 20 minutes. After the addition of 1,3-propane sultone, the obtained product mixture was poured into acetone (200 g.) while stirring to precipate white crystals. The precipitate was separated by filtration after being cooled to room temperature, washed with acetone (50 g.) and dried to obtain 223 g. of sodium sulfoalkyl methacrylate. 5 g. of the additional product was obtained from the filtrate by recrystallization. The total yield of the product was 99 percent and purity was 98.8 percent, which was determined by the saponification value and content of the double bonds.

EXAMPLE 2

Acrylic acid (50 g.), potassium acrylate (110 g.), benzene (20 g.) and hydroquinone (0.5 g.) were charged into the same reaction vessel as in the Example 1. To this mixture, 1,4-butane sultone (136 g.) was added at 120° – 130° C. while stirring for over 25 minutes. The reaction was then continued at the same temperature for an additional 5 minutes. Benzene (200 g.) was added to the mixture under vigorous agitation to precipitate white crystals. 241 g. of potassium sulfobutylacrylate was obtained by treating the precipitate in the same manner as in the Example 1. The yield was 98 percent and the purity was 98.3 percent.

EXAMPLE 3

Methacrylic acid (100 g.), lithium methacrylate (92 g.) and phenol (1.0 g.) were placed in the same reaction vessel as in the Example 1. To the mixture, 1,3-propane sultone (122 g.) was added at 70° – 80° C. while stirring for over 20 minutes, and then toluene (200 g.) was added to precipitate the crystals. The crystals were treated in the same manner as in Example 1 to obtain 212 g. of lithium sulfopropylmethacrylate. The yield was 99 percent and the purity was 99 percent.

EXAMPLE 4

Acrylic acid (150 g), calcium acrylate (91 g.) and hydroquinone (0.2 g.) were placed in the same vessel as in the Example 1. To this mixture, 1,3-propane sultone (122 g.) was added at 100° – 110° C. while stirring for over 20 minutes. The product mixture was treated in the same manner as in the Example 1 to obtain 208 g. of calcium sulfopropyl acrylate. The yield was 97 percent and the purity was 98.2 percent.

EXAMPLE 5

Methacrylic acid (129 g.) and hydroquinone monomethyl ether (0.5 g.) were charged into a vessel equipped with a stirrer, thermometer, reflux condenser and an inlet source of ammonia gas. To this mixture, ammonia gas (17 g.) was introduced at 40° C. to partly convert methacrylic acid into ammonium methacrylate. 1,3-propane sultone (122 g.) was then added at 80° – 90° C. while stirring for over 30 minutes. The product mixture was poured into toluene (500 g.) to precipitate white crystals. The crystal was treated in the same manner as in the Example 1 to obtain 214 g. of ammonium sulfopropylmethacrylate. The yield was 95 percent and the purity was 97.9 percent.

EXAMPLE 6

Methacrylic acid (150 g.) and hydroquinone (1.0 g.) were charged into a reaction vessel equipped with a stirrer, thermometer, reflux condenser, dropping funnel, carbonate inlet and carbon dioxide outlet. To this mixture, potassium carbonate (69 g.) was added at 20° – 40° C. while stirring for over 20 minutes, and 1,3-propane sultone (122 g.) was added dropwise at 80° – 90° C. while stirring for over 30 minutes. Benzene (200 g.) was added to the product mixture to precipitate white crystals. The crystals were treated in the same manner as in the Example 1 to obtain 273 g. of potassium sulfopropyl methacrylate. The yield was 96.5 percent and the purity was 98.0 percent.

EXAMPLE 7

Methacrylic acid (180 g.), xylene (50 g.), 1,3-propane sultone (122 g.) and hydroquinone monomethyl ether (1.0 g.) were charged into the same reaction vessel as in the Example 6. To this mixture, sodium carbonate (53 g.) was added at 70° – 80° C. while stirring for over 20 minutes. The mixture was maintained in this condition for an additional 10 minutes. The product mixture was poured into xylene (150 g.) to precipitate white crystals. The crystals were treated in the same manner as in the Example 1 to obtain 220 g. of sodium sulfopropyl methacrylate having the purity of 97.0 percent in the yield of 95.6 percent.

What is claimed is:

1. In a process for producing a salt of sulfoalkyl acrylate or a salt of sulfoalkyl methacrylate by reacting at least one salt selected from the class consisting of alkali metal acrylates, alkaline earth metal acrylates, ammonium acrylates and the corresponding methacrylic acid salts with at least one alkane sultone selected from the class consisting of 1,3-propane sultone and 1,4-butane sultone, the improvement which comprises carrying out the reaction in the presence of at least one acid selected from the class consisting of acrylic acid and methacrylic acid in an amount of at least one-half mole of acid per mole of the said salt.

2. A process according to claim 1 in which the mixture of the salt and the acid has been produced by neutralizing the acid with a basic compound so as to be within the ratio specified in claim 1.

3. A process according to claim 1 in which the reaction is carried out at 30° – 160° C.

4. A process according to claim 2 in which the basic compound is sodium carbonate, potassium carbonate or ammonia.

* * * * *